United States Patent
Kurokawa

(10) Patent No.: US 8,593,657 B2
(45) Date of Patent: Nov. 26, 2013

(54) IMAGE PROCESSING METHOD, IMAGE PROCESSING APPARATUS, IMAGE FORMING APPARATUS, AND RECORDING MEDIUM FOR DETECTING PRINTING-PROHIBITED PATTERN

(75) Inventor: Takashi Kurokawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 460 days.

(21) Appl. No.: 13/014,716

(22) Filed: Jan. 27, 2011

(65) Prior Publication Data
US 2011/0188059 A1 Aug. 4, 2011

(30) Foreign Application Priority Data

Feb. 1, 2010 (JP) ................................ 2010-020464

(51) Int. Cl.
*G06K 15/00* (2006.01)
(52) U.S. Cl.
USPC .......... 358/1.14; 358/1.9; 358/3.28; 382/165; 382/181
(58) Field of Classification Search
USPC ................. 358/1.9, 1.14, 3.28; 382/165, 181
See application file for complete search history.

(56) References Cited

U.S. PATENT DOCUMENTS

| 5,771,315 | A * | 6/1998 | Matsuyama | 382/191 |
| 6,169,608 | B1 * | 1/2001 | Yoshida | 358/1.9 |
| 6,298,150 | B1 | 10/2001 | Sonoda et al. | |
| 6,888,962 | B1 | 5/2005 | Sonoda et al. | |
| 2001/0017717 | A1 * | 8/2001 | Ishida et al. | 358/464 |
| 2008/0292189 | A1 * | 11/2008 | Morimoto et al. | 382/181 |
| 2010/0188675 | A1 * | 7/2010 | Tanaka | 358/1.9 |

FOREIGN PATENT DOCUMENTS

| JP | 54-32322 A | 3/1979 |
| JP | 8-98020 A | 4/1996 |
| JP | 9-16043 A | 1/1997 |
| JP | 9-44669 A | 2/1997 |

\* cited by examiner

*Primary Examiner* — Benny Q Tieu
*Assistant Examiner* — Quyen V Ngo
(74) *Attorney, Agent, or Firm* — Birch, Stewart, Kolasch & Birch, LLP

(57) ABSTRACT

A specific color detecting section 1 includes: a comparing section 7 for comparing, with reference thresholds, color densities of color image data of plural colors in input image data, so as to judge whether or not the input image data include color image data of a specific color of an image pattern; and a threshold setting section 51 for setting calculated thresholds or theoretical thresholds as the reference thresholds, wherein the threshold setting section 51 a calculated threshold as a reference threshold if the calculated threshold is within an allowable range of the theoretical threshold, and the threshold setting section sets a theoretical threshold as a reference threshold if the calculated threshold is out of the allowable range of the theoretical threshold, the threshold setting section being configured to calculate out the calculated thresholds for the reference thresholds from reference image data obtained by reading out a reference chart having plural colors in predetermined color densities, and the threshold setting section being configured to work out the theoretical thresholds for the reference thresholds according to the predetermined color densities of the reference chart.

16 Claims, 10 Drawing Sheets

| Color YELLOW COLOR RANGE |
|---|
| CY1_GRmin ≦ G-R ≦ CY1_GRmax |
| CY1_GBmin ≦ G-B ≦ CY1_GBmax |
| CY1_RBmin ≦ R-B ≦ CY1_RBmax |
| CY1_Bmin ≦ B ≦ CY1_Bmax |
| CY1_Gmin ≦ G ≦ CY1_Gmax |
| CY1_Rmin ≦ R ≦ CY1_Rmax |

FIG. 9

| COLOR | THRESHOLD | DEVIATION UPPER LIMIT |
|---|---|---|
| BLACK | (G-R)min | 5 |
| | (G-R)max | 5 |
| | (G-B)min | 5 |
| | (G-B)max | 5 |
| | (R-B)min | 5 |
| | (R-B)max | 5 |
| | Bmin | 5 |
| | Bmax | 5 |
| | Gmin | 5 |
| | Gmax | 5 |
| | Rmin | 5 |
| | Rmax | 5 |

IMAGE PROCESSING METHOD, IMAGE PROCESSING APPARATUS, IMAGE FORMING APPARATUS, AND RECORDING MEDIUM FOR DETECTING PRINTING-PROHIBITED PATTERN

This Nonprovisional application claims priority under 35 U.S.C. §119(a) on Patent Application No. 2010-020464 filed in Japan on Feb. 1, 2010, the entire contents of which are hereby incorporated by reference.

TECHNICAL FIELD

The present invention relates to (i) an image processing method and an image processing apparatus each for detecting a printing-prohibited pattern in an image, e.g., a banknote, marketable securities, a confidential document, or the like, which is prohibited from being printed, (ii) an image forming apparatus, and (iii) a recording medium.

BACKGROUND ART

Color copying apparatuses have been improved in printing performance, and this has made it possible to reproduce a document image in form of a printed image of highly accuracy. In such circumstances, it has been demanded that the color copying apparatuses have advanced prevention functions to take countermeasures against an act of counterfeiting a printing-prohibited image, such a banknote, marketable securities, a confidential document, or the like, by printing the printing-prohibited image that has been read out by a scanner or captured by a digital camera or a camera built in a mobile phone.

Copying prohibition techniques have been employed in copying apparatuses, and a conventionally known form of the technique is described as follows. Image data (readout image data) are obtained by reading out, with an image readout apparatus, a document image printed on a recording medium. Subsequently, the image data thus obtained are compared with image data (registered image data) of a specific image which are registered, as a copying-prohibited target, in a copying apparatus in advance. Then, whether printing of the readout image data should be executed or not is determined based on a result of the comparison. In the technique, furthermore, in a case where it is determined that no printing of the readout image data should be executed, printing of the readout image data is stopped simply, or the readout image data are replaced by different image data so that the different image data thus replacing the readout image data are printed.

Techniques of Patent Literatures 1 to 3 have been known as concrete examples of the above type of the conventional technique. In the technique of Patent Literature 1, (i) a specific pattern for preventing image copying is formed in a document surface, (ii) when an image on the document is read out, a detecting section detects the specific pattern out from image data, and (iii) the detecting section outputs a detection signal so as to cause a copying function of a copying apparatus to be stopped.

Patent Literature 2 discloses a technique in which an image processing apparatus includes (i) a binarization processing section including first and second color-extracting blocks, (ii) an OR circuit, (iii) a storage apparatus, (iv) a mark detecting section, (v) a document cutout section, and (vi) a matching section. In the image processing apparatus, the first color-extracting block performs a black binarization process for input image data, and the second color-extracting block performs, independently from the first color-extracting block that performs the black binarization process, a red binarization process for the input image data. Two sets of data thus processed independently from each other are converted to single data by the OR circuit, and stored in the storage apparatus. Then, the mark detecting section detects a square-shaped mark out from the input image data by using a template. Subsequently, the image cutout section cuts out a mark surrounded by the square-shaped mark thus detected, and then, the matching section evaluates similarity between the mark thus cut out and a copying-prohibited determination mark (specific mark). After this, a signal indicative of a result of this is outputted.

Patent Literature 3 discloses a technique in which, in an image processing apparatus, (i) a first color-spatial similarity evaluating circuit determines similarity between an image signal for an input document image and color distribution information on a specific image stored in a ROM, (ii) the number of pixels similar between the inputted document image and the specific image is counted based on the similarity thus evaluated, and (iii) similarity between the input document image and the specific image is evaluated based on the number of the pixels thus counted.

CITATION LIST

Patent Literature 1

Japanese Patent Application Publication, Tokukaisho, No. 54-32322 A (Publication Date: Mar. 9, 1979)

Patent Literature 2

Japanese Patent Application Publication, Tokukaihei, No. 9-16043 A (Publication Date: Jan. 17, 1997)

Patent Literature 3

Japanese Patent Application Publication, Tokukaihei, No. 9-44669 A (Publication Date: Feb. 14, 1997)

SUMMARY OF INVENTION

Technical Problem

All conventional techniques including those disclosed in Patent Literatures 1 to 3 compare between a value obtained from input image data, e.g., a value obtained from a specific mark or a specific pattern in input image data, and a predetermined threshold, so as to judge whether or not the input image data are image data of a specific image. In the conventional techniques, therefore, it is possible to perform an accurate detection operation in a case where a correct value is set as the threshold. However, in a case where a wrong value is set as the reference, it is impossible to perform any accurate detection operation. That is, in a case where setting of the threshold fails to be performed properly, it is impossible to accurately identify a printing-prohibited image.

In the conventional techniques, the threshold is normally set, based on reference image data which are obtained by reading out a reference image having a color in a predetermined color density. The conventional techniques, however, have a problem that, in a case where the reference image has a problem, e.g., unevenness in a color density, stain, or the like, it is impossible to set accurate threshold accordingly to the reference image data.

There are available (i) image processing apparatuses for reading out a document image to obtain image data and performing an image process for the image data thus obtained, (ii) image forming apparatuses for performing an printing operation accordingly to image data obtained as described above, and the like. The image processing apparatuses or the image forming apparatuses, however, have individual differences among themselves. In a case where a threshold is set in a manner that such an individual difference can be dealt with, it is more likely that false detection of the specific image, e.g., false detection of the specific mark or the specific pattern in the specific image, arises. In consideration of this, it is necessary to set a threshold in each apparatus independently.

A factor that causes the individual difference encompasses: variations (variations among light reception sensitivities of CCDs or colors of filters) among image readout sensors in image readout apparatuses (scanners), variations (variations in brightness or colors) among lamps of image readout apparatuses, and the like.

In view of the above, an object of the present invention is to provide an image processing method, an image processing apparatus, an image forming apparatus, and a recording medium, in each of which a reference threshold for use in judgment as to whether or not input image data are image data of a specific image is set accordingly to reference image data obtained by reading out a reference image. In the image processing apparatus, the image forming apparatus, and the recording medium thus provided, even if the reference image has a problem, such as, e.g., unevenness in color densities, stain, or the like, it is still possible to set proper thresholds. It is therefore possible to make accurate judgment as to whether or not the input image data are the image data of the specific image.

Solution to Problem

In order to attain the object, an image processing apparatus of the present invention includes: a similarity evaluating section for detecting, out of input image data, an image pattern similar to a printing-prohibited pattern, and evaluating similarity between the image pattern thus detected and the printing-prohibited pattern, the similarity evaluating section including a specific color detecting section for detecting, out of the input image data, color image data of a specific color of the image pattern, the specific color detecting section including: a comparing section for comparing, with reference thresholds, color densities of color image data of plural colors in the input image data, so as to judge whether or not the input image data include the color image data of the specific color of the image pattern; and a threshold setting section for setting calculated thresholds or theoretical thresholds as the reference thresholds, wherein the threshold setting section sets a calculated threshold as a reference threshold if the calculated threshold is within an allowable range of the theoretical threshold, and the threshold setting section sets a theoretical threshold as a reference threshold if the calculated threshold is out of the allowable range of the theoretical threshold, the threshold setting section being configured to calculate out the calculated thresholds for the reference thresholds from reference image data obtained by reading out a reference chart having a plurality of colors in predetermined color densities, and the threshold setting section being configured to work out the theoretical thresholds for the reference thresholds according to the predetermined color densities of the reference chart.

An image processing method of the present invention includes: performing a similarity evaluation for detecting, out of input image data, an image pattern similar to a printing-prohibited pattern, and evaluating similarity between the image pattern thus detected and the printing-prohibited pattern, the step of performing the similarity evaluation including performing specific color detection for detecting, out of the input image data, color image data of a specific color of the image pattern, the step of performing the specific color detection including: comparing, with reference thresholds, color densities of color image data of plural colors in the input image data, so as to judge whether or not the input image data include the color image data of the specific color of the image pattern; and setting calculated thresholds or theoretical thresholds as the reference thresholds, wherein a calculated threshold is set as a reference threshold if the calculated threshold is within an allowable range of the theoretical threshold, and a theoretical threshold is set as a reference threshold if the calculated threshold is out of the allowable range of the theoretical threshold, wherein the calculated thresholds for the reference thresholds are calculated out from reference image data obtained by reading out a reference chart having a plurality of colors in predetermined color densities, and the theoretical thresholds for the reference thresholds are worked out according to the predetermined color densities of the reference chart.

In the configurations, the similarity evaluating section (the step of performing the similarity evaluation) detects, out off the input image data, the image pattern similar to the printing-prohibited pattern, and then evaluates similarity between the image pattern thus detected and the printing-prohibited pattern. The similarity evaluating section (the step of performing the similarity evaluation) includes the specific color detecting section (the step of performing the specific color detection) for detecting, out of the input image data, the color image data of the specific color of the image pattern.

The specific color detecting section (the step of performing the specific color detection) includes the comparing section (the step of comparing) for comparing, with the reference thresholds, the color densities of image data of the plural colors in the input image data, so as to judge whether or not the input image data include the color image data of the specific color of the image pattern.

The specific color detecting section (the step of performing the specific color detection) includes the threshold setting section (the step of performing the setting of the reference thresholds) for: calculating our the calculated thresholds for the reference thresholds from reference image data obtained by reading out a reference chart having a plurality of colors in predetermined color densities; and working out the theoretical thresholds for the reference thresholds accordingly to predetermined color densities of the reference chart. The threshold setting section (the step of performing the setting of the reference thresholds) sets a calculated threshold as a reference threshold if the calculated threshold is within an allowable range of a theoretical threshold. On the other hand, the threshold setting section (the step of performing the setting of the reference thresholds) sets, as a reference threshold, a theoretical threshold in replacement of the calculated threshold if the calculated threshold is out of the allowable range of the theoretical threshold.

In the configuration, even in a case where the reference chart has a problem such as, for example, unevenness in color densities, stain, or the like, it is still possible to set proper values as the reference thresholds for use in the comparing section (the step of performing the comparison). This in turn make it possible to make accurate judgment as to whether or not the input image data are the image data of the specific image.

An image processing apparatus of the present invention includes: a similarity evaluating section for detecting, out of input image data, an image pattern similar to a printing-prohibited pattern, and evaluating similarity between the image pattern thus detected and the printing-prohibited pattern, the similarity evaluating section including a specific color detecting section for detecting, out of the input image data, color image data of a specific color of the image pattern, the specific color detecting section including: a comparing section for comparing, with reference thresholds, color densities of color image data of plural colors in the input image data, so as to judge whether or not the input image data include the color image data of the specific color of the image pattern; and a threshold setting section for setting calculated thresholds or theoretical thresholds as the reference thresholds, wherein the threshold setting section sets a calculated threshold as a reference threshold if the calculated threshold is within an allowable range of the theoretical threshold, the threshold setting section sets an upper limit of an allowable range of a theoretical threshold as a reference threshold if the calculated threshold is greater than the upper limit of the allowable range of the theoretical threshold, and the threshold setting section sets a lower limit of an allowable range of a theoretical threshold as a reference threshold if the calculated threshold is smaller than the lower limit of the allowable range of the theoretical threshold, the threshold setting section being configured to calculate out the calculated thresholds for the reference thresholds from reference image data obtained by reading out a reference chart having a plurality of colors in predetermined color densities, and the threshold setting section being configured to work out the theoretical thresholds for the reference thresholds according to the predetermined color densities of the reference chart.

An image processing method of the present invention includes: performing similarity evaluation for detecting, out of input image data, an image pattern similar to a printing-prohibited pattern, and evaluating similarity between the image pattern thus detected and the printing-prohibited pattern, the step of performing the similarity evaluation including performing specific color detection for detecting, out of the input image data, color image data of a specific color of the image pattern, the step of performing the specific color detection including: comparing, with reference thresholds, color densities of color image data of plural colors in the input image data, so as to judge whether or not the input image data include the color image data of the specific color of the image pattern; and setting calculated thresholds or theoretical thresholds as the reference thresholds, wherein a calculated threshold is set as a reference threshold if the calculated threshold is within an allowable range of the theoretical threshold, an upper limit of an allowable range of a theoretical threshold is set as a reference threshold if the calculated threshold is greater than the upper limit of the allowable range of the theoretical threshold, and a lower limit of an allowable range of a theoretical threshold is set as a reference threshold if the calculated threshold is smaller than the lower limit of the allowable range of the theoretical threshold, wherein the calculated thresholds for the reference thresholds are calculated from reference image data obtained by reading out a reference chart having a plurality of colors in predetermined color densities, and the theoretical thresholds for the reference thresholds are worked out according to the predetermined color densities of the reference chart.

In the configurations, the similarity evaluating section (the step of performing the similarity evaluation) detects, out of the input image data, the image pattern similar to the printing-prohibited pattern, and then evaluates the similarity between the image pattern thus detected and the printing-prohibited pattern. The similarity evaluating section (the step of performing the similarity evaluation) includes the specific color detecting section (the step of performing the specific color detection) for detecting, out of the input image data, the color image data of the specific color of the image pattern.

The specific color detecting section (the step of performing the specific color detection) includes the comparing section (the step of performing the comparison) for comparing, with the reference thresholds, the color densities of the color image data of the plural colors in the input image data, so as to judge whether or not the input image data include the color image data of the specific color of the image pattern.

The specific color detecting section (the step of performing the specific color detection) includes the threshold setting section (the step of performing the setting of thresholds) for: calculating out the calculated thresholds for the reference thresholds from the reference image data obtained by reading out the reference chart having the plural colors in the predetermined color densities; and working out the theoretical thresholds for the reference thresholds accordingly to the predetermined color densities of the reference chart. The threshold setting section (the step of performing the setting of thresholds) sets a calculated threshold as a reference threshold if the calculated threshold is within an allowable range of a theoretical threshold. On the other hand, the threshold setting section (the step of performing the setting of thresholds) sets, as a reference threshold, an upper limit of an allowable range of a theoretical threshold in replacement of a calculated threshold if the calculated threshold is greater than the upper limit of the allowable range of the theoretical threshold. Further, the threshold setting section (the step of performing the setting of thresholds) sets, as a reference threshold, a lower limit of an allowable range of a theoretical threshold in replacement of a calculated threshold if the calculated threshold is smaller than the lower limit of the allowable range of the theoretical threshold.

Therefore, even in a case where the reference chart has a problem such as, e.g., unevenness in color densities, stain, or the like, it is still possible to set proper values as the reference thresholds for use in the comparing section (the step of performing the comparison). This in turn makes it possible to make accurate judgment as to whether or not the input image data are image data of a specific image.

Advantageous Effects of Invention

With the configurations of the present invention, it is possible that, even in a case where a reference chart has some sort of problems, e.g., unevenness in color density, stain, or the like, an appropriate value be set as a reference threshold to be used by the comparator (comparing step). This in turn makes it possible to accurately determine whether input image data are image data of a specific image, or not.

BRIEF DESCRIPTION OF DRAWINGS

FIG. 9 is a view showing examples of a theoretical threshold worked out by the threshold calculating section shown in FIG. 6.

DESCRIPTION OF EMBODIMENTS

One embodiment of the present invention is described below with reference to the drawings.

Figure 2:
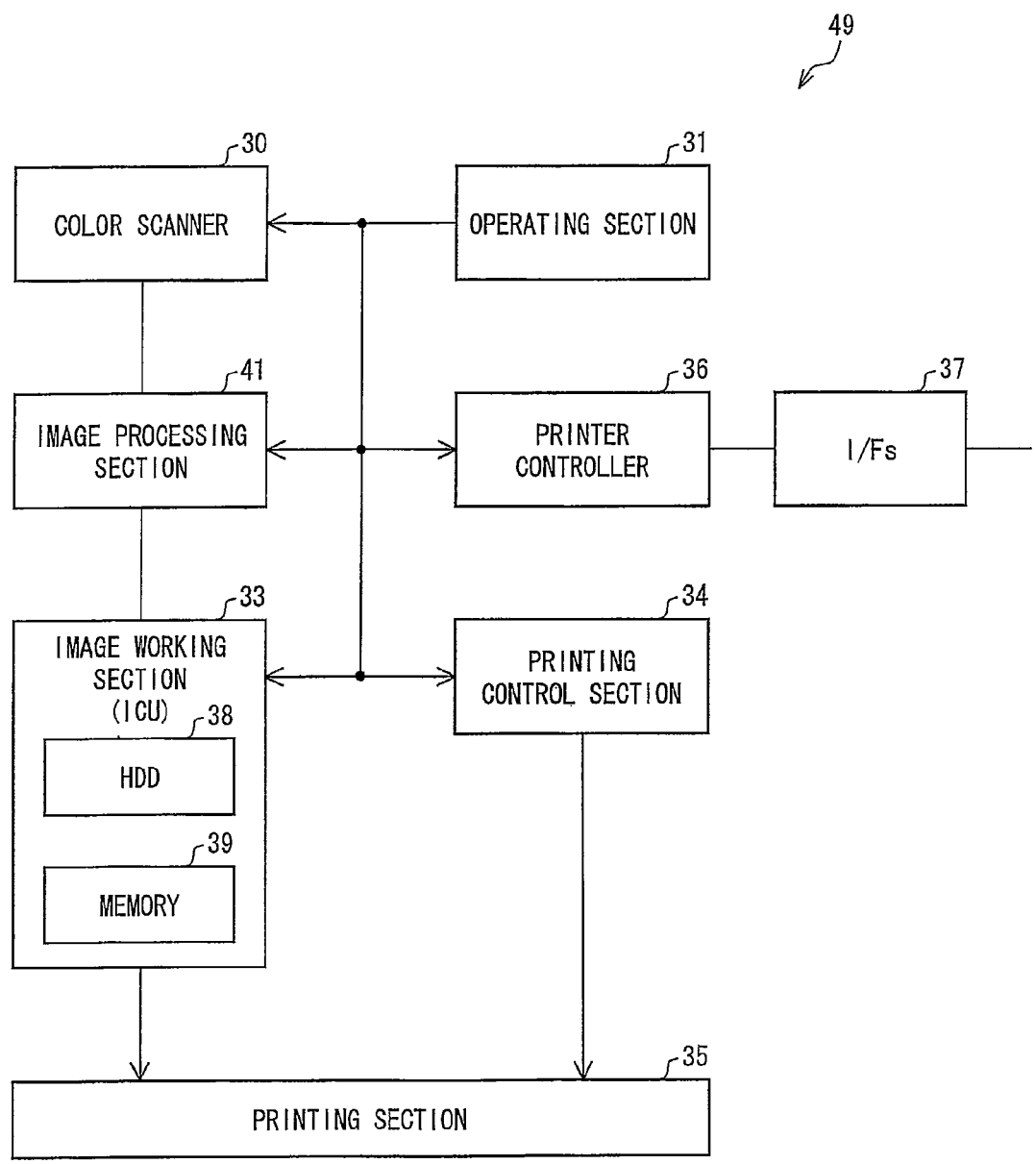
FIG. 2 is a view showing a block arrangement of an image forming apparatus including the similarity evaluating section shown in FIG. 1.

FIG. 2 is a view showing a block arrangement of an image forming apparatus 49, such as a copying machine or the like, which includes an image processing section 41 of the present embodiment. The image forming apparatus 49 includes a color scanner 30, the image processing section 41, an operation section 31, a printer controller 36, interfaces (I/F) 37, an image working section 33, a printing control section 34, and a printing section 35.

The image processing section 41 receives image data (RGB data) which have been obtained by reading out a document by the color scanner 30. However, the present embodiment is not limited to this. Instead, for example, image data that are captured by a digital camera can be inputted to the image processing section 41 via the interfaces 37 and the printer controller 36. The image processing section 41 processes the image data thus received, and sends them to the image working section 33.

The image working section 33 works the image data subjected to the process by the image processing section 41, so as to obtain image data processable in printing. The printing section 35 has a function as a printer, and causes the image data outputted form the image working section 33 to be printed on a paper. The printing control section 34 performs control over the operation of the printing section 35.

This is described in detail below. In a case where the printing control section 34 receives, from the image processing section 44, a signal indicative of a detection result that the image data, printing of which has been instructed, are image data of a specific image containing a printing-prohibited pattern, the printing control section 34 performs (i) stopping the printing section 35 from performing a printing operation, (ii) causing a warning to be displayed on, for example the operation panel, (iii) causing target image data stored in image memories (HDD (hard disk drive) 38 and memory 39) to be deleted, and the like.

Figure 3:
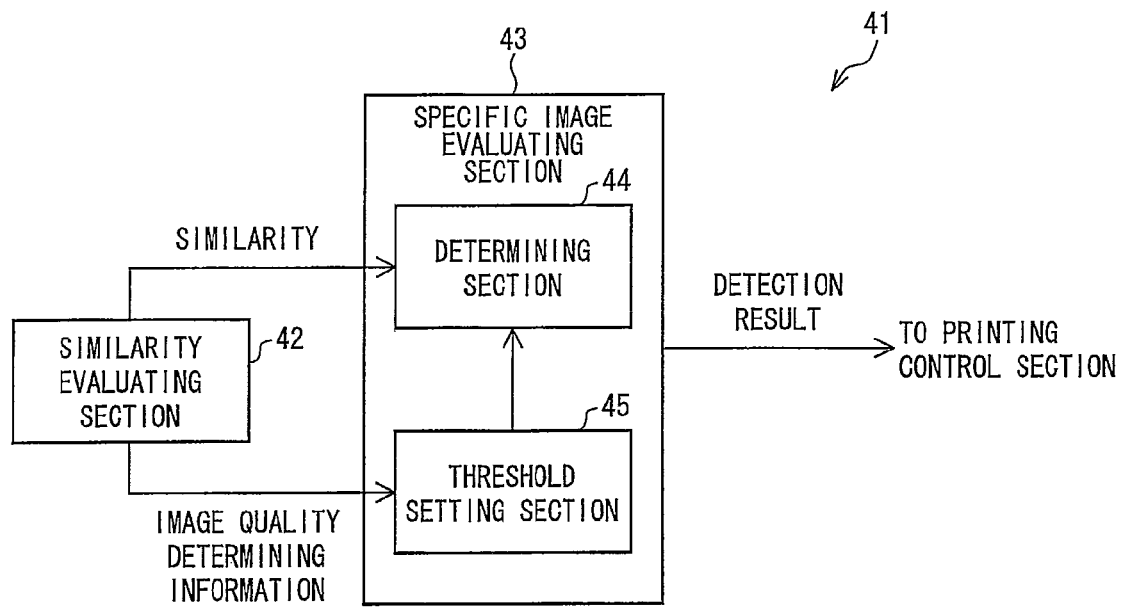
FIG. 3 is a view showing a block arrangement of an image processing section shown in FIG. 2.

FIG. 3 is a view showing a block arrangement of the image processing section 41 shown in FIG. 2. As shown in FIG. 3, the image processing section 41 includes a similarity evaluating section 42 and a specific image evaluating section 43.

The similarity evaluating section 42 detects, out from input image data, an image pattern similar to the printing-prohibited pattern (copying-prohibited pattern). Then, the similarity evaluating section 42 evaluates similarity between the image pattern thus detected and the printing-prohibited pattern. Subsequently, the similarity evaluating section 42 outputs a signal indicative of the similarity thus determined.

The specific image evaluating section 43 includes a determining section 44 and a threshold setting section 45. The determining section 44 receives the signal indicative of the similarity from the similarity evaluating section 42, and, in response, compares the similarity with a given threshold so as to judge whether or not the input image data are image data of a specific image containing a printing-prohibited pattern 71. The given threshold is set by the threshold setting section 45.

The printing-prohibited pattern is contained in an image on a document, e.g., a banknote, marketable securities, a confidential document, or the like, which is prohibited from being printed (copied). The printing-prohibited pattern has a specific color and includes a plurality of marks which are positioned in a specific relative positional relationship.

Figure 4:
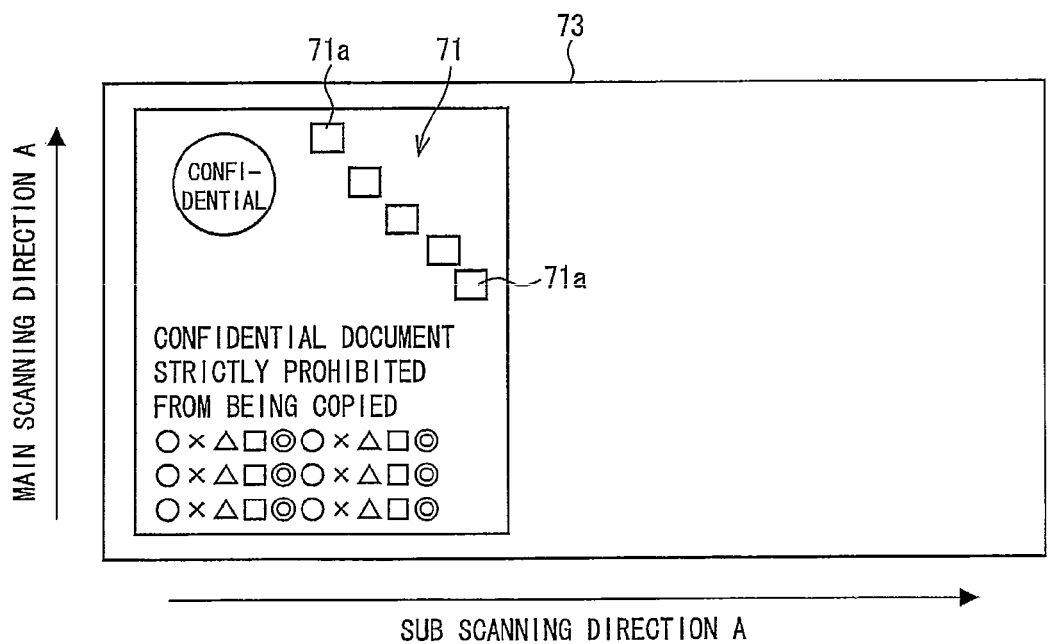
FIG. 4 is a plan view showing one example of a document that contains a printing-prohibited pattern.

FIG. 4 shows a concrete example of the printing-prohibited pattern 71. FIG. 4 is a plan view showing one example of the document 73 on which an image containing the printing-prohibited pattern 71 is formed. As shown in FIG. 4, the printing-prohibited pattern 71 includes a plurality of marks 71a which are arranged, relatively to one another, at respective specific positions. In the example shown in FIG. 4, the printing-prohibited pattern 71 includes five marks 71a which are arranged along a single line extending in an oblique direction in an upper part (which is, in FIG. 4, in a left part of the document 73) of the image printed on the document 73. Each of the five marks 71a has a square shape. In the present embodiment, the printing-prohibited pattern 71 is formed in a color document, and has a yellow color. However, the printing-prohibited pattern 71 shown in FIG. 4 is merely illustrative. Thus, the present embodiment is not limited to the shape or the number of the marks 71a, a space between the marks 71a or a direction in which the marks 71a are arranged, or the color of the marks 71a.

Figure 1:
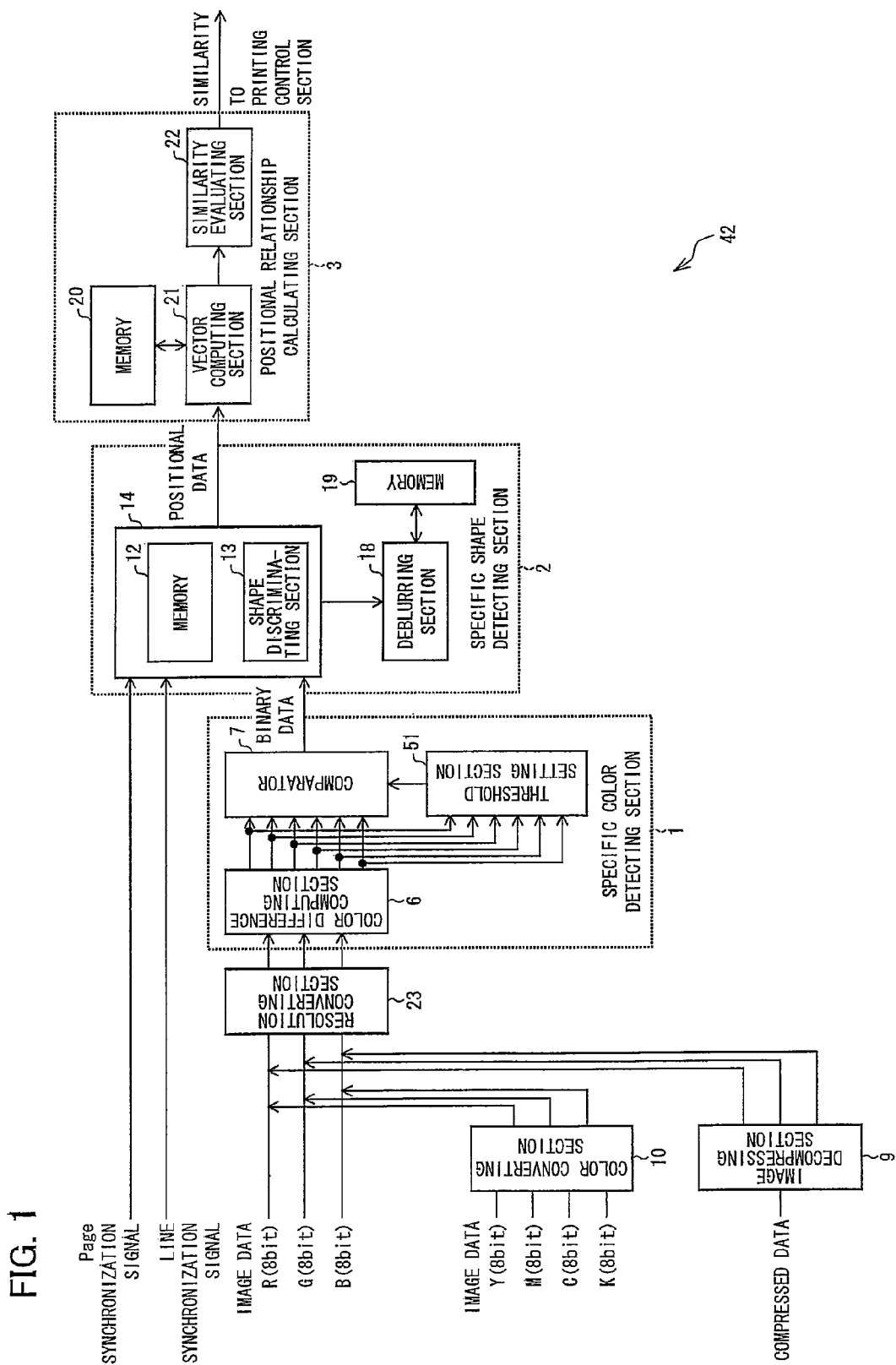
FIG. 1 is a view showing a block arrangement of a similarity evaluating section of an image forming apparatus, in accordance with an embodiment of the present invention.

FIG. 1 is a view showing a block arrangement of the similarity evaluating section 42 of the image processing section 41, in accordance with the present embodiment. As shown in FIG. 1, the similarity evaluating section 42 includes an image decompressing section 9, a color converting section 10, a resolution converting section 23, a specific color detecting section 1, a specific shape detecting section 2, and a positional relationship calculating section 3.

The image decompressing section 9 receives, from the printer controller 36 shown in FIG. 2, image data (e.g., image data captured by a digital camera) which may or may not be compressed data such as JPEG. In a case where the image data thus received are the compressed data, the image decompressing section 9 decompresses the image data so as to covert them to bitmap data.

The color converting section 10 receives, from the printer controller 36, image data which may or may not be any of YMC (yellow, magenta, cyan) image data, YMCK (yellow, magenta, cyan, black) image data, and the like but RGB image data. In a case where the image data thus received are any of the image data other than RGB image data, the color converting section 10 converts them to 8-bit R, G, and B (red, green, and blue) image data.

The resolution converting section 23 receives image data inputted from an image inputting apparatus, e.g., the color scanner 30 shown in FIG. 2, a digital camera, or the like. In response, the resolution converting section 33 causes resolution of the image data to be converted to given resolution. Then, the resolution converting section 23 outputs the image data of the given resolution to the specific color detecting section 1. In an example shown in FIG. 1, the resolution converting section 23 receives 8-bit R, G, and B image data inputted from the printer controller 36. Resolution of the image data inputted to the resolution converting section 23 may or may not be 300 DPI (DOT PER INCH) which is reference resolution for resolution of image data to be processed by the image processing apparatus 41 of the present embodiment. In a case where the resolution of the image data inputted to the resolution converting section 23 is other than 300 DPI, the resolution converting section 23 performs a resolution conversion process so as to covert it to 300 DPI.

The resolution converting section 23 sends the image data to the specific color detecting section 1. In response, the specific color detecting section 1 detects, out from the image data, color image data of the specific color. Then, the specific color detecting section 1 binarizes the color image data of the specific color thus detected, and outputs them to the specific shape detecting section 2. In the present embodiment, the color image data of the specific color are color image data of a specific color of the printing-prohibited pattern 71 in the input image data inputted. The image processing apparatus 41 of the present embodiment includes one specific color detecting section 1 for detecting the printing-prohibited pattern 71 having a yellow color. However, the present embodiment is not limited to this. In order to detect yellow and red colors of the printing-prohibited patterns 71, the image processing apparatus 41 can include two specific color detecting sections 1 accordingly to the number of colors of the printing-prohibited patterns 71. The specific color detecting section 1 includes a color difference computing section 6, a comparator (comparing section) 7, and a threshold setting section 51, so as to detect the printing-prohibited pattern 71 of a specific color. The color difference computing section 6, the comparator 7, and the threshold setting section 51 of the specific color detecting section 1 are later described in detail.

The specific shape detecting section 2 detects, out from binary image data thus inputted from the specific color detecting section 1, a specific shape indicative of the printing-prohibited pattern 71. In a case of detecting the specific shape indicative of the printing-prohibited pattern 71, the specific shape detecting section 1 detects a position of it. After this, the specific shape detecting section 1 sends positional data of the specific shape, which are a result of the detection of the position of the specific shape, to the positional relationship calculating section 3. The specific shape detecting section 2 includes a detection operation section 4, a deblurring section 18, and a memory 19.

The detection operation section 14 includes a shape discriminating section 13 and a memory 12. The shape discriminating section 13 processes binary image data of, for example, a faint specific color indicative of a mark 71a of a printing-prohibited pattern 71 so as to detect a specific shape (which is quadrate in the present embodiment). Also, the shape discriminating section 13 detects a position of the specific shape. At a time when the shape discriminating section 13 performs the above operation, lines of the binary image data are temporarily stored in the memory 12.

Figure 5:
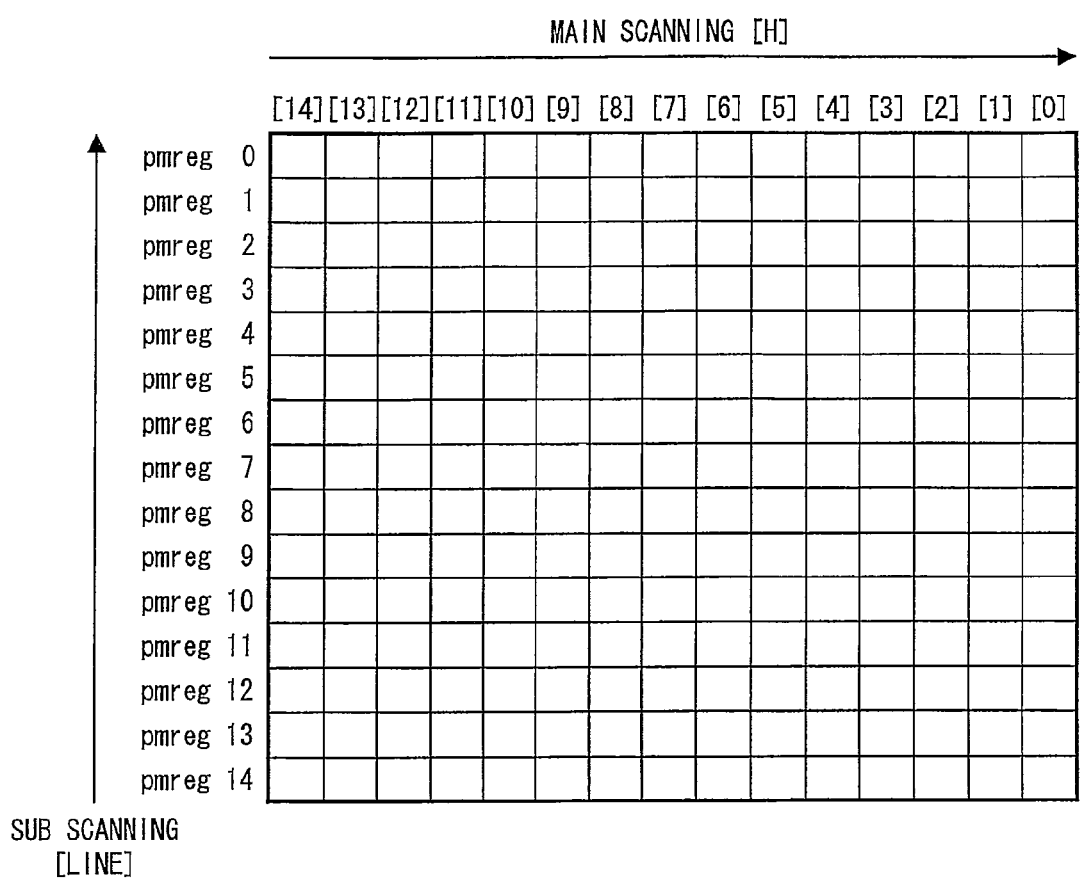
FIG. 5 is a view showing one example of a template for use in template matching by a shape discriminating section of a specific shape detecting section shown in FIG. 1.

FIG. 5 is an explanatory view showing one example of a template for use in template matching by the shape discriminating section 13. In a specific shape detection operation described above, the shape discriminating section 13 of the specific shape detecting section 2 uses a template of, for example, 15 (which indicates that each line of a main scanning direction has 15 pixels)×15 (which indicates that there are 15 lines in a sub scanning direction) as shown in FIG. 5.

In a case where the image processing apparatus 41 of the present embodiment includes two or more specific color detecting sections 1 accordingly to the number of colors of the printing-prohibited pattern 71, as described above, two or more shape discriminating sections 13 are provided for the respective corresponding two or more specific color detecting sections 1. This, however, causes no increase in a circuit size of the memory 12, since the marks 71a of the printing-prohibited pattern 71 has a small shape. Further, in the case where two or more shape discriminating sections 13 are provided, signals indicative of detection results are sent to the positional relationship calculating section 3.

In a case where the detection operation section 14 detects the specific shape (shape of the marks 71a of the printing-prohibited pattern 71), the deblurring section 18 causes a given range of image data (pixel) around the specific shape to be turned into a mask region. Thus, it is possible to deal with image blur which may be caused in a case where, for example, an imaging device is exposed to unintentional shaking or the like while operating at an image reading phase of an image reading process. By this, the deblurring section 18 prevents the specific shape (printing-prohibited pattern 71), which is originally a single shape, from being detected in the given range multiple times. At a time when the deblurring section 18 performs the above operation, lines of the image data are temporality stored in the memory 19. If two or more specific shape detecting sections 2 are provided, single deblurring section 18 can be shared among them.

The positional relationship calculating section 3 includes a memory 20, a vector computing section 21, and a similarity evaluating section 22. The vector computing section 21 receives the positional data of the specific shapes (printing-prohibited pattern 71) from the specific shape detecting section 2. In response, the vector computing section 21 performs vector computation, based on the positional data of the specific shapes thus received, so as to determine whether the positional data are data indicative of the printing-prohibited pattern 71 or not. The memory 20 serves as a working region where the vector computing section 21 performs the above operation. In a case where the vector computing section 21 has determined that the positional data are the data indicative of the printing-prohibited pattern 71, the similarity evaluating section 22 determines similarity between the specific shapes and the printing-prohibited pattern 71, and outputs a signal indicative of the similarity thus determined.

Figure 6:
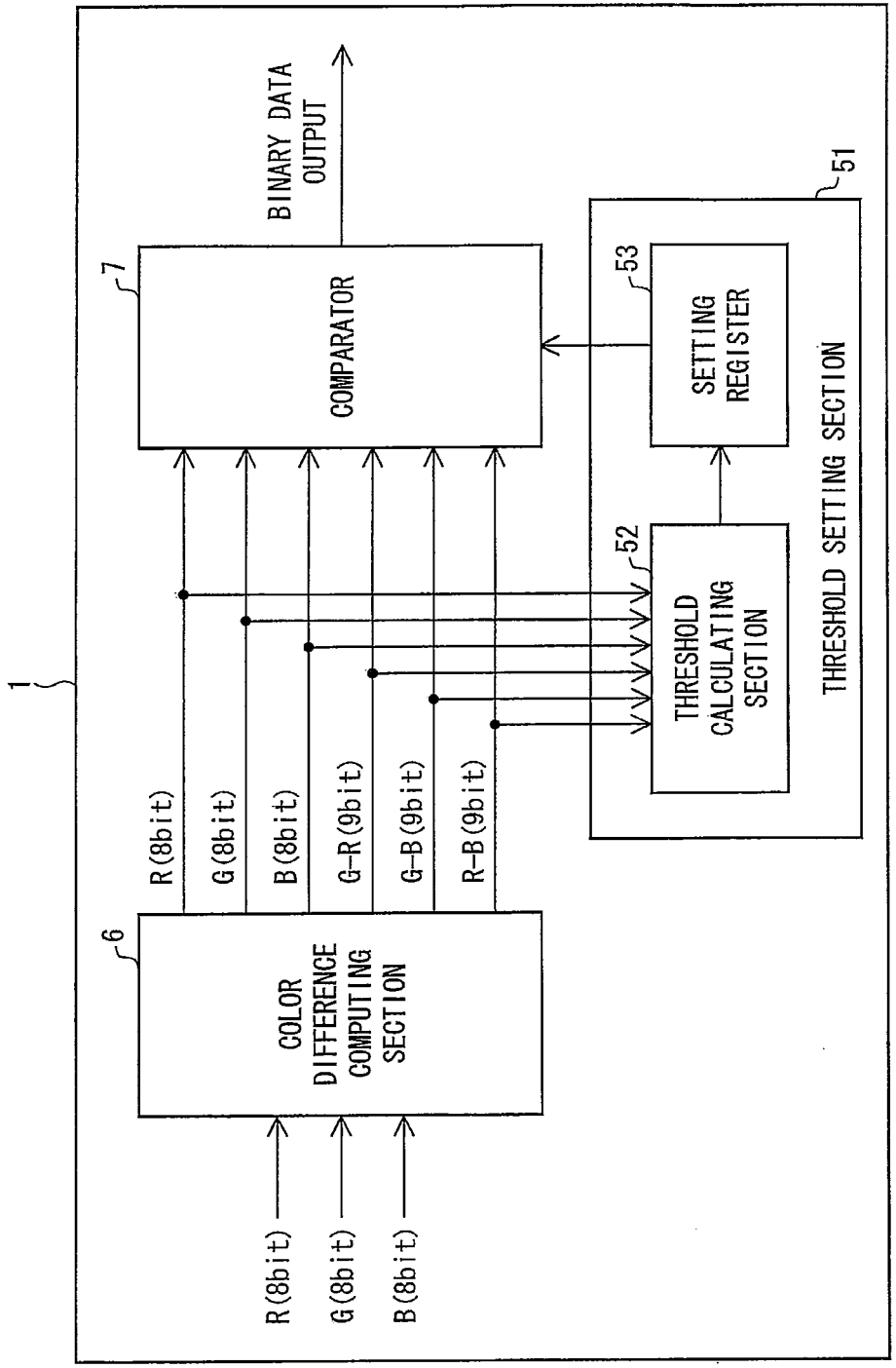
FIG. 6 is a view showing a block arrangement of the specific shape detecting section shown in FIG. 1.

The specific color detecting section 1 is described in detail below with reference to FIG. 6. FIG. 6 is a view showing a block arrangement of the specific color detecting section 1.

The color difference computing section 6 of the specific color detecting section 1 receives the 8-bit R (red), G (green), and B (blue) image data from the resolution converting section 23. In response, the color difference computing section 6 calculates G-R (color difference between green and red), G-B (color difference between green and blue), and R-B (color difference between red and blue). The color differences thus calculated can be negative, and as such, image data (color difference signals) indicative of the color differences are 9-bit data. After this, the specific color detecting section 6 outputs six sets of R, G, B, G-R, G-B, and R-B image data to the comparator 7.

The threshold setting section 51 includes a threshold calculating section 52 and a setting register 53. The setting register 53 sets a maximum value (upper limit threshold) and a minimum value (lower limit threshold) for a parameter of each of the six sets of R, G, B, G-R, G-B, and R-B image data. The maximum value and the minimum value thus set define a range within which a corresponding specific color of the printing-prohibited pattern 71 is detectable. The maximum value (upper limit threshold) and the minimum value (lower limit threshold), which are set for the parameter by the setting register 53, are determined by the threshold calculating section 52.

The comparator 7 receives six parameters of the image from the color difference computing section 6. In response, the comparator 7 compares each of the six parameters with a maximum value (reference threshold) and a minimum value (reference threshold) which are set for corresponding one of the six parameters. Subsequently, the comparator 7 outputs a signal indicative of a comparison result as binary data. This is described in detail as follows. The comparator 7 outputs "1" in a case where the six parameters are not greater than respective corresponding maximum values and not less than respective corresponding minimum values, and outputs "0" in any other case. The comparator 7 thus outputs binary data. It follows that the 8-bit R, G, and B image data are converted to 1-bit image data whose data amount is ¼ of data amounts of the 8-bit R, G, and B image data.

Concrete examples of the maximum values and the minimum values, which are set in the setting register 53, are described below. In order that the given color, which is yellow in this case, is detected, R_min=160, R_max=230, G_min=160, G_max=215, B_min=90, B_max=150, G-R_min=−25, G-R_max=10, G-B_min=20, G-B_max=105, R-B_min=50, and R-B_max=130, where light yellow is indicated by 255, and dark yellow is indicated by 0.

Figures 7, 8:
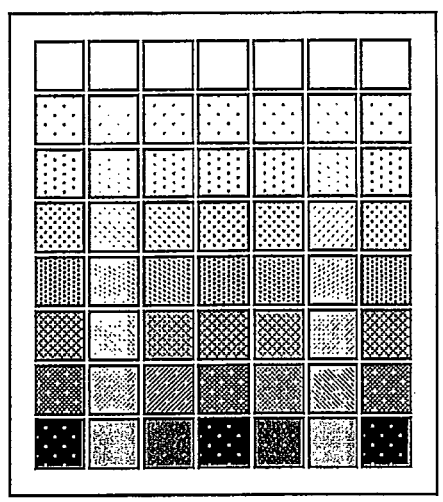
FIG. 7 is a view showing examples of maximum values and minimum values for a yellow color which is a specific color, the maximum values and the minimum values being set in a setting register shown in FIG. 6.
FIG. 8 is a view showing one example of a reference chart which is used when a threshold calculating section shown in FIG. 6 calculates out a threshold to be set in a setting register.

FIG. 7 shows examples (i.e., examples of color filer thresholds for yellow) of the maximum values and the minimum values which are set, in the setting register 53, for a set of the six parameters of a yellow color. Specifically, the examples shown in FIG. 7 are made with respect to a case where a printing-prohibited pattern 71 has its color in a yellow color range. In FIG. 7, six types of ranges indicate, sequentially from top to bottom, a range of a color difference between green and red, a range of a color difference between green and blue, a range of a color difference between red and blue, a range of blue, a range of green, and a range of red.

FIG. 8 is a view showing one example of a reference chart which is used when the threshold calculating section 52 calculates out the thresholds. In the reference chart, each grid has a color in such a manner that grids on a horizontal line are different from one another in terms of a color and grids on a longitudinal line are varied from one another in terms of a color density (a color density is lower sequentially from a grid on the lower line to a grid on the upper line).

The threshold calculating section 52 calculates out calculated thresholds and theoretical thresholds for the thresholds (reference thresholds) to be set in the setting register 53. Further, the threshold calculating section 52 sets either the calculated thresholds or the theoretical thresholds as the thresholds in the setting register 53.

Similarly to a conventional counterpart, the threshold calculating section 52 uses image data that are obtained by reading out the reference chart by the color scanner 30, so as to determine the calculated thresholds. That is, the threshold calculating section 52 uses readout values, which are color density values obtained from the image data of the reference chart, so as to determine the calculated threshold. Since data of the colors and color densities of the grids of the reference chart are obtained in advance, the threshold calculating section 52 stores color density values of the grids of the reference chart as reference values. Thus, the threshold calculating section 52 uses the reference values so as to determine the theoretical thresholds.

In the present embodiment, the calculated thresholds are thus determined by using the image data that have been obtained by reading out the reference chart by the scanner 30. This, however, poses a problem that the calculated thresholds reflect individual variations among apparatus, i.e., (i) individual variations among image readout sensors of color scanners 30 (variations among light reception sensitivities of CCDs, those among filter colors), (ii) individual variations among lamps of the color scanners 30 (variations in brightness, colors, or the like), or the like.

FIG. 9 is a view showing theoretical thresholds determined by the threshold calculating section 52. FIG. 9 shows, as one example, theoretical thresholds being set for a set of six parameters of a black color among the colors of the reference chart. Calculated thresholds determined by the threshold calculating section 52 are similar to the theoretical thresholds shown in FIG. 9. As shown in FIG. 9, in the preset embodiment, for each color of the reference chart, the threshold calculating section 52 determines a maximum value (determination threshold) and a minimum value (determination thresholds) of each of the six parameters R, G, B, G-R, G-B, and R-B. Thus, there are determined twelve sets of calculated thresholds and twelve sets of theoretical thresholds.

Further, as shown in FIG. 9, a deviation upper limit is set with respect to deviation of each calculated threshold from a theoretical threshold. The deviation upper limit is indicative of an allowable range within which the calculated threshold can be deviated from (both deviated to be less than and deviated to be greater than) the theoretical threshold. It follows that, from the theoretical threshold and the deviation upper limit, it is possible to know the allowable range. This is described in detail as follows. In the example shown in FIG. 9, (i) an upper limit of the allowable range is determined by adding a deviation upper limit of 5 to an upper limit (e.g., (G-R)max) of the theoretical threshold, and (ii) a lower limit of the allowable range is determined by subtracting the deviation upper limit of 5 from a lower limit (e.g., (G-R)min) of the theoretical threshold.

In the example shown in FIG. 9, deviation upper limits are identical with one another. However, the present embodiment is not limited to this. Alternatively, a different deviation upper limit can be set, as appropriate, with respect to deviation of each calculated threshold from a theoretical threshold.

The following description discusses an operation that the threshold calculating section 52 sets thresholds in the setting register 53. At a time when setting the thresholds in the setting register 53, the threshold calculating section 52 compares a calculated threshold with a corresponding theoretical value so as to determine a deviation value by which the calculated threshold is deviated from the theoretical threshold (i.e., a difference between the calculated threshold and the theoretical threshold). In a case where the deviation value is not greater than an upper limit of deviation, the threshold calculating section 52 sets the calculated threshold, as the threshold, in the setting register 53. On the other hand, in a case where the deviation value is greater than the upper limit of deviation, the threshold calculating section 52 sets a threshold in the setting register 53 accordingly to any of first to third determining rules of threshold.

(1) First Determining Rule of Threshold

According to a first determining rule of a threshold, if some of calculated thresholds are deviated from theoretical values by degrees greater than deviation upper limits, then only those of the calculated values are replaced by theoretical thresholds.

In the first determining rule for threshold, (i) only that calculated threshold, which is deviated from the theoretical threshold by a deviation value greater than a deviation upper limit, (i.e., that calculated threshold which is not within an allowable range) is replaced by a corresponding theoretical threshold, and (ii) the corresponding theoretical threshold thus replacing the calculated threshold is set as a threshold. This brings about an effect that deals with variations among apparatuses and sets a reference threshold which is adjusted, within a level where no false detection occurs, accordingly to an individual difference of an apparatus. It is therefore possible to accurately judge whether input image data are given image data or not.

(2) Second Determining Rule for Threshold

In the second determining rule of threshold, in a case where some of calculated thresholds are deviated from theoretical values by deviation values greater than deviation upper limits, entire sets of the calculated thresholds are replaced by theoretical thresholds. Further, in this case, calculated thresholds for parameters of all the colors are replaced by theoretical thresholds. However, the present embodiment is not limited to this. Alternatively, replacing of calculated thresholds with theoretical thresholds can be performed limitedly to a color in which a calculated threshold is deviated from a theoretical threshold by a deviation value greater than a deviation upper limit.

The second determining rule of threshold is designed for a case in which a reference chart has a stain formed therein or the like, and is thereby unreliable. According to the second determining rule of threshold, in a case where some of calculated thresholds are deviated from theoretical thresholds by deviation values, entire image data of the reference chart thus obtained are considered to be unreliable. Thus, not only those of the calculated thresholds which are deviated from the theoretical thresholds by deviation values greater than the deviation upper limits, but also the rest of the calculated thresholds are replaced with the theoretical thresholds. The theoretical thresholds thus replacing all the calculated thresholds are set. This makes it possible to prevent any inappropriate calculated threshold from being set wrongly.

(3) Third Determining Rule for Threshold

In a case where some of calculated thresholds are deviated from theoretical thresholds by deviation values greater than deviation upper limits, only that sets of thresholds are replaced by (i) upper limits (each of which is determined by adding a deviation upper limit to an upper limit of a theoretical threshold) of an allowable range of deviation of the calculated threshold, or (ii) lower limits (each of which is determined by subtracting the deviation upper limit from a lower limit of the theoretical threshold) of the allowable range of deviation of the calculated threshold.

This is described in detail as follows. In a case where (i) the upper limit of the theoretical threshold is 100, (ii) the upper limit of the calculated threshold is 110, and (iii) the deviation upper limit is 5, for example, the calculated threshold is deviated from the theoretical threshold by a deviation value of 10, which exceeds the deviation upper limit by 5. In this case, therefore, the upper limit of a threshold to be set in the setting register 53 is set so that:

the upper limit (100) of the theoretical threshold+the deviation upper limit (5)=105.

Similarly, in a case where (i) the lower limit of the theoretical threshold is 90, (ii) the lower limit of the calculated threshold is 80, and (iii) the deviation upper limit is 5, for example, the calculated threshold deviates from the theoretical threshold by a deviation value of 10, which exceeds the deviation upper limit by 5. In this case, therefore, the lower limit of a threshold to be set in the setting register 53 is set so that:

the lower limit (90) for the theoretical threshold−the deviation upper limit (5)=85.

In the threshold calculating section 52, which one of the first to third determining rules of threshold to employ is determined as appropriate at time, for example, when the image forming apparatus 49 is adjusted before being delivered to a market. Among the first to third determining rules of threshold, the first and second determining rules of threshold are so that a calculated threshold is replaced by a theoretical threshold. This makes it possible to more effectively prevent a situation that a threshold in the setting register 53 is changed wrongly by using a defective reference chart, as compared to a case in which the third determining rule of threshold is employed. In the third determining rule of threshold, on the other hand, a calculated threshold is replaced by any value between the calculated threshold and a theoretical threshold, instead that the calculated threshold is replaced directly by the theoretical threshold. Thus, in a case where color scanners 30 out of a manufacturing process have greater individual variations, it is possible to set a threshold that matches the individual variations among the color scanners 30 better, as compared to a case in which the first determining rule of threshold or the second determining rule of threshold is employed. The case in which the color scanners 30 out of the manufacturing process have the greater individual variations encompasses (i) a case in which individual variations among image readout sensors (individual variations among light reception sensitivities of CCDs, those among color filters) are greater, (ii) individual variations among lamps of image readout apparatuses (variations among brightness, or those among colors) are greater, and the like.

Figure 10:
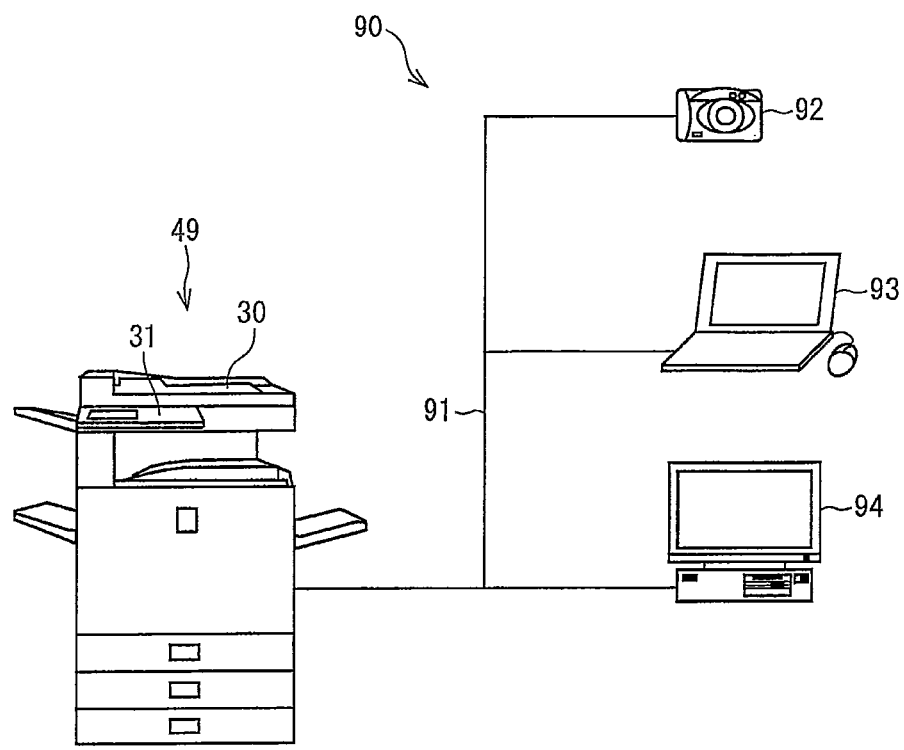
FIG. 10 is a view schematically showing a configuration of an image forming system including the image forming apparatus shown in FIG. 2.

FIG. 10 is a view schematically showing an arrangement of an image forming system 90 including the image forming apparatus 49. As shown in FIG. 10, the image forming system 90 is so that the image forming apparatus 49 is connected to a digital camera 92, a laptop type personal computer (hereinafter referred to as a note PC) 93, and a desktop type personal computer (hereinafter referred to as a PC) 94 via a network 91.

An image to be processed, such as an image read out by the color scanner 42, an image captured by the digital camera 92, an image downloaded in the note PC 93 and the PC 94 via a computer networks, e.g., Internet, or the like, is inputted to the image forming apparatus 49 via the network 91. The image forming apparatus 49 prints the image, as appropriate, in response to an instruction. For this, in the image forming apparatus 49, the specific image evaluating section 43 determines whether the image contains the printing-prohibited pattern 71 or not, by running its printing-prohibited pattern detecting function (function to determine whether there is an image pattern similar to the printing-prohibited pattern, or not). In a case where it is determined that the image contains the printing-prohibited pattern 71, printing of the image is prohibited, and image data of the image are deleted from the HDD (hard disk drive) 38 and the memory 39 of the image working section 33 shown in FIG. 2. Thus, it is possible to prevent a banknote and marketable securities from being counterfeited and a confidential document from being copied.

Figure 11:
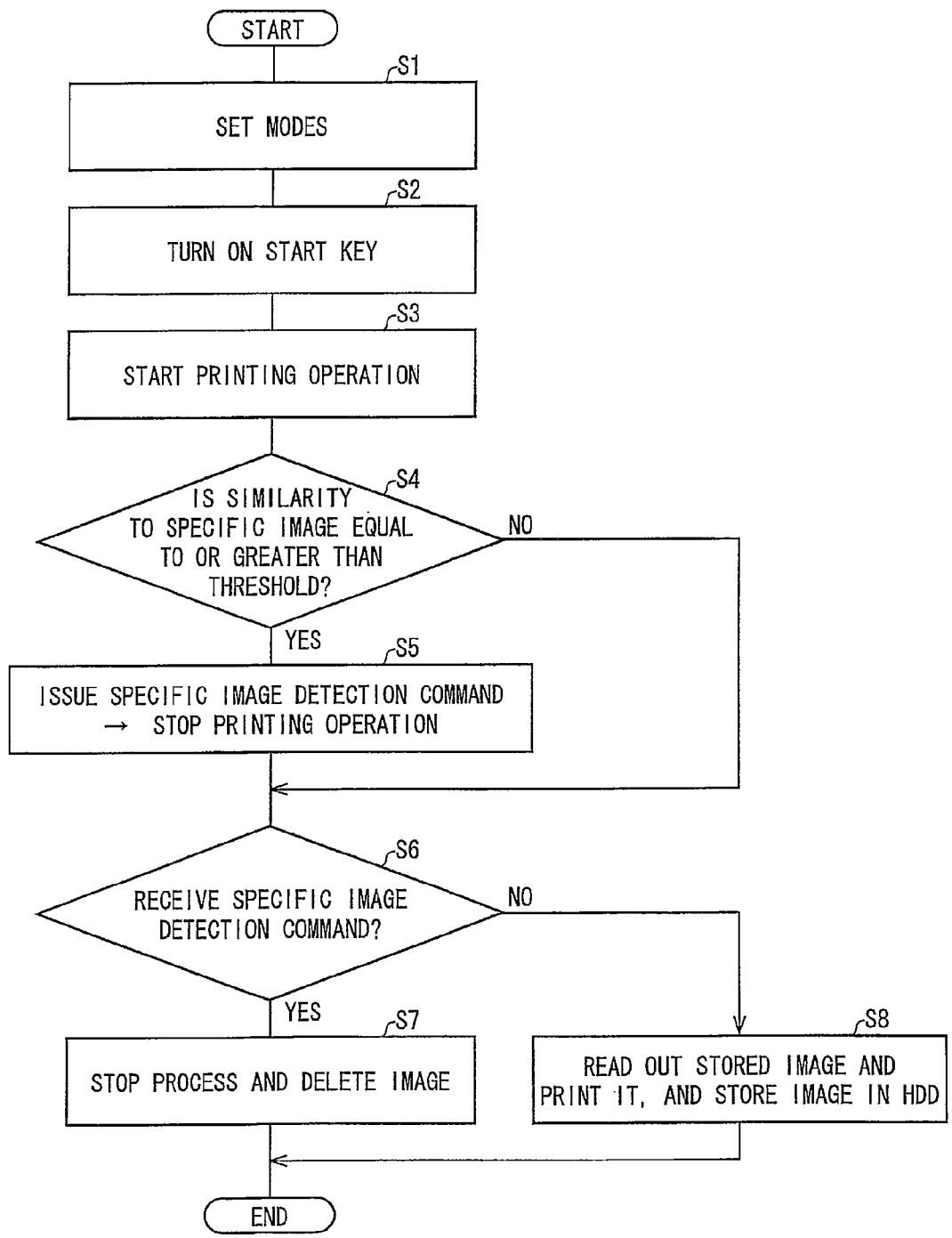
FIG. 11 is a flow chart showing steps of an operation that the image forming apparatus shown in FIG. 2 performs the printing.

With reference to a flow chart shown in FIG. 11, the following description discusses how the image forming apparatus 49 of the present embodiment thus configured operates.

In the image forming apparatus 49, at a preparation phase for a printing operation, modes are set (S1), and a start key of the operating section 31 is turned on (S2). In response to this, the printing operation is started (S3).

The similarity evaluating section 42 processes input image data, printing of which has been instructed, by evaluating similarity between the input image data and image data of a specific image containing the printing-prohibited pattern 71. Then, the similarity evaluating section 42 outputs a signal indicative of the similarity thus determined to the specific image evaluating section 43. In the specific image evaluating section 43, in response, the determining section 44 compares the similarity and a threshold, which is set by the threshold setting section 45, with each other so as to determine whether the similarity is equal to or greater than the threshold, or not (S4).

In a case where it is determined that the similarity is equal to or greater than the threshold, a specific image detection command is issued (S5).

The printing control section 34 receives the specific image detection command (S6), and, in response, stops a printing process and causes image data stored in the image working section 33 to be deleted (S7). On the other hand, in a case where the printing control section receives no specific image detection command, it allows the printing of the input image data to be executed, and causes the input image data to be stored in the hard disk (HDD) of the printing working section 33 (S8).

Figure 12:
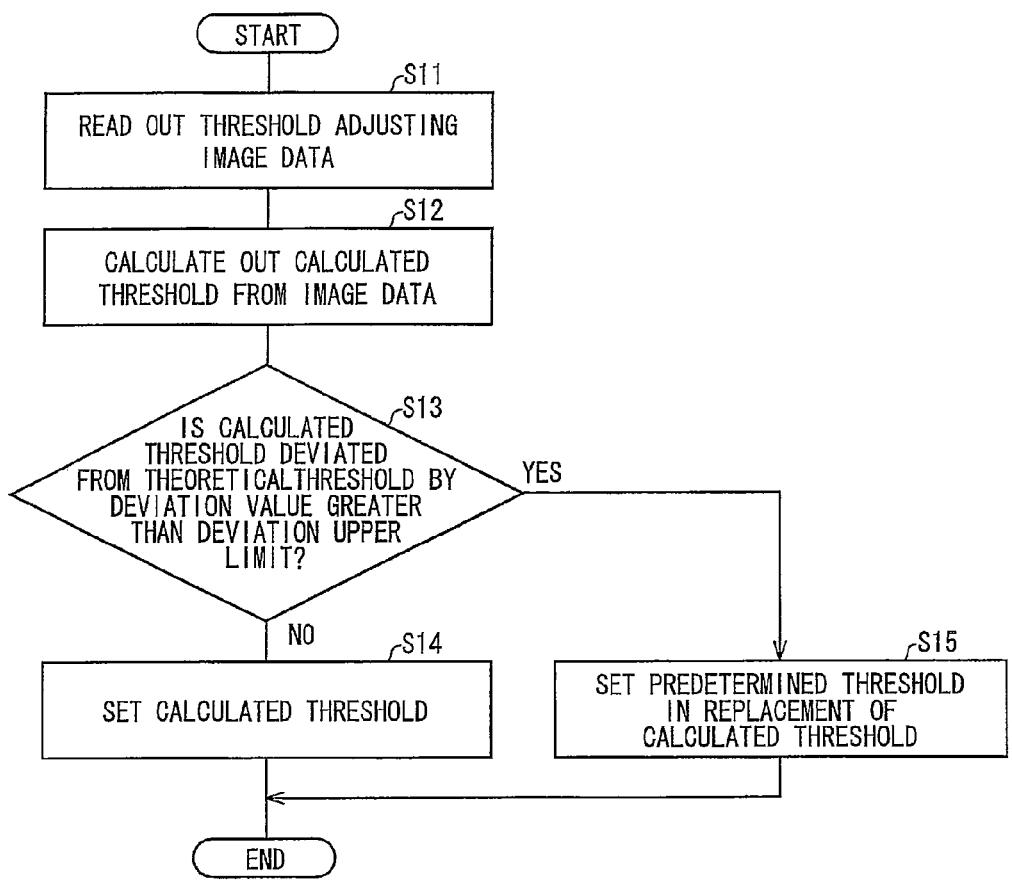
FIG. 12 is a flow chart showing steps of an operation that the threshold setting section of a specific color detecting section shown in FIG. 6 sets a threshold.

With reference to the flow chart shown in FIG. 12, the following description discusses an operation that the threshold setting section 51 of the specific color detecting section 1 shown in FIG. 6 sets a threshold.

The color scanner 30 reads out the reference chart shown in FIG. 8 so as to obtain input image data. Then, the input image data are inputted to the specific color detecting section 1 of the image processing section 41.

In the threshold setting section 51 of the specific color detecting section 1, the threshold calculating section 52 reads in the input image data thus obtained from the reference chart (S11). Subsequently to this, the specific color detecting section 1 calculates out a calculated threshold (S12).

Furthermore, the threshold calculating section 52 determines whether the calculated threshold is deviated from a theoretical threshold by a deviation value greater than a deviation upper limit, or not (S13). In a case where it is determined that the calculated threshold is deviated from the theoretical threshold by a deviation value smaller than the deviation upper limit, the threshold calculating section 52 sets the calculated threshold, as the threshold, in the setting register 53 (S14).

On the other hand, in a case where it is determined at the step S13 that the calculated threshold is deviated from the theoretical threshold by a deviation value greater than the deviation upper limit, the threshold calculating section 52 replaces the calculated threshold by a threshold which is determined by any of the first to third determining rules of threshold, and then sets the threshold in the setting register (S15).

In the specific color detecting section 1, the comparator 7 uses the threshold thus set by the threshold calculating section 52, so as to determine whether or not the input image data contain color image data of a specific image of the printing-prohibited pattern. Subsequently, the specific color detecting section 1 outputs a signal indicative of a determination result to the specific shape detecting section 2.

As described above, in the image forming apparatus 49 of the present embodiment, it is determined whether the input image data are image data of the specific image containing the printing-prohibited pattern, or not. For this, the specific color detecting section 1 determines whether the input image data contain color image data of the specific color of the printing-prohibited pattern or not, by comparing color density values of color image data of plural colors in the input image data with predetermined thresholds. The predetermined thresholds are set by the threshold setting section 51 of the specific color detecting section 1 as follows. The threshold setting section 51 compares (i) a calculated threshold, which is determined from color density values of reference image data that are obtained by reading out a reference chart, with (ii) a theoretical threshold, which are determined from predetermined color density values of the reference image data. Then, in a case where it is determined that the calculated threshold falls within a predetermined allowable range within which it is allowed to be deviated from the theoretical threshold, the threshold setting section 51 sets the calculated threshold as the predetermined threshold. On the other hand, in a case where it is determined that the calculated threshold falls outside the predetermined allowable range, the threshold setting section 51 replaces the calculated threshold by the theoretical threshold and sets the theoretical value as the predetermined threshold.

Therefore, even in a case where the reference chart has some sort of a problem, e.g., unevenness in color densities, stain, or the like, it is still possible to set a proper value as the predetermined threshold. This in turn makes it possible to make accurate judgment as to whether or not the input image data are the image data of the specific image.

Finally, the blocks of the image processing section 41 of the image forming apparatus 49 may be realized by way of hardware or software as executed by a CPU as follows.

The image processing section 41 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the image processing section 41 a computer-readable storage medium containing control program code (executable program, intermediate code program, or source program) for the image processing section 41, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (registered trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

Further, the image processing section 41 may be arranged so as to be connectable to a communications network so that the program code is supplied to the microscope through the communications network. The communications network is not particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth (registered trademark), 802.11, HDR, mobile phone network, satellite connections, and terrestrial digital network. Note that the present invention can be also realized by the program codes in the form of a computer data signal embedded in a carrier wave which is embodied by electronic transmission.

As described so far, the image processing apparatus of the present invention can be configured so that if the threshold setting section sets, as a reference threshold, a theoretical threshold in replacement of the calculated threshold, the threshold setting section replaces, with the theoretical threshold, only the calculated threshold that is out of the allowable range of the theoretical threshold.

In the configuration, the threshold setting section replaces, with the theoretical threshold, only the calculated threshold that is out of the allowable range of the theoretical threshold. This can deal with variations among image processing apparatuses, and makes it possible to set a reference threshold that is determined, within a range where false detection is caused, accordingly to an individual difference of among image processing apparatuses. It is therefore possible to make accurate judgment as to whether or not the input image data are data of a specific image.

Furthermore, the image processing apparatus can be configured so that if the threshold setting section sets, as a reference threshold, a theoretical threshold in replacement of the calculated threshold, the threshold setting section replaces all the calculated thresholds with the theoretical thresholds regardless of whether the calculated thresholds are out of the allowable range of the theoretical threshold.

In the configurations, in a case where the reference chart has a problem such as stain formed therein or the like and is thereby unreliable, the threshold setting section sets all the theoretical threshold as the reference thresholds, in doubt that not only a part of calculated thresholds which are deviated from theoretical thresholds, but also an entire set of the calculated thresholds calculated out from the image obtained by reading out the reference chart might be unreliable. This makes it possible to prevent any wrong calculated threshold from being set as a reference thresholds.

The image processing apparatus can be configured so that the printing-prohibited pattern includes a plurality of marks positioned in a predetermined positional relationship with one another; the similarity evaluating section further includes a specific shape detecting section and a positional relationship calculating section; the specific color detecting section outputs binary data that is a result of the detection of the color image data of the specific color of the image pattern; the specific shape detecting section detects, from the binary data, a relative positional relationship of a plurality of marks of the image pattern, and outputs positional data that is a result of the detection of the relative positional relationship; and the positional relationship calculating section compares between the relative positional relationship of the plurality of the marks of the image pattern and the predetermined positional relationship of the plurality of the marks of the printing-prohibited pattern, so as to evaluate the similarity between the image pattern and the printing-prohibited pattern.

In the configuration, the specific color detecting section outputs binary data which is a result of the detection of the color image data of the specific color of the image pattern similar to the printing-prohibited pattern. The specific shape detecting section detects, out of the binary data, the relative positional relationship of a plurality of marks of the image pattern, and outputs positional data that is a result of the detection of the relative positional relationship. The positional relationship calculating section compares between the relative positional relationship of a plurality of the marks of the image pattern and the predetermined positional relationship of a plurality of the marks of the printing-prohibited pattern, so as to evaluate the similarity between the image pattern and the printing-prohibited pattern. Therefore, in a case where the printing-prohibited pattern includes a plurality of the marks positioned in the predetermined positional relationship, it is possible to accurately evaluate the similarity between the image pattern in the input image data and the printing-prohibited pattern.

The present invention is not limited to the description of the embodiments above, but may be altered by a skilled person within the scope of the claims. An embodiment based on a proper combination of technical means as disclosed in different embodiments is encompassed in the technical scope of the present invention.

REFERENCE SIGNS LIST 1. specific color detecting section
2. specific shape detecting section
3. positional relationship calculating section
6. color difference computing section
7. comparator (comparing section)
30. color scanner
41. image processing section
49. image forming apparatus
51. threshold setting section
52. threshold calculating section
53. setting register
71. printing-prohibited pattern
71a. mark
73. document

The invention claimed is:

1. An image processing apparatus comprising:
a similarity evaluating section for detecting, out of input image data, an image pattern similar to a printing-prohibited pattern, and evaluating similarity between the image pattern thus detected and the printing-prohibited pattern,
the similarity evaluating section including a specific color detecting section for detecting, out of the input image data, color image data of a specific color of the image pattern,
the specific color detecting section including:
a comparing section for comparing, with reference thresholds, color densities of color image data of plural colors in the input image data, so as to judge whether or not the input image data include the color image data of the specific color of the image pattern; and
a threshold setting section for setting calculated thresholds or theoretical thresholds as the reference thresholds, wherein the threshold setting section sets a calculated threshold as a reference threshold if the calculated threshold is within an allowable range of the theoretical threshold, and the threshold setting section sets a theoretical threshold as a reference threshold if the calculated threshold is out of the allowable range of the theoretical threshold, the threshold setting section being configured to calculate out the calculated thresholds for the reference thresholds from reference image data obtained by reading out a reference chart having a plurality of colors in predetermined color densities, and the threshold setting section being configured to work out the theoretical thresholds for the reference thresholds according to the predetermined color densities of the reference chart.

2. The image processing apparatus as set forth in claim 1, wherein:

if the threshold setting section sets, as a reference threshold, a theoretical threshold in replacement of the calculated threshold, the threshold setting section replaces, with the theoretical threshold, only the calculated threshold that is out of the allowable range of the theoretical threshold.

3. The image processing apparatus as set forth in claim 1, wherein:

if the threshold setting section sets, as a reference threshold, a theoretical threshold in replacement of the calculated threshold, the threshold setting section replaces all the calculated thresholds with the theoretical thresholds regardless of whether the calculated thresholds are out of the allowable range of the theoretical threshold.

4. The image processing apparatus as set forth in claim 1, wherein:

the printing-prohibited pattern includes a plurality of marks positioned in a predetermined positional relationship with one another;

the similarity evaluating section further includes a specific shape detecting section and a positional relationship calculating section;

the specific color detecting section outputs binary data that is a result of the detection of the color image data of the specific color of the image pattern;

the specific shape detecting section detects, from the binary data, a relative positional relationship of a plurality of marks of the image pattern, and outputs positional data that is a result of the detection of the relative positional relationship; and the positional relationship calculating section compares between the relative positional relationship of the plurality of the marks of the image pattern and the predetermined positional relationship of the plurality of the marks of the printing-prohibited pattern, so as to evaluate the similarity between the image pattern and the printing-prohibited pattern.

5. The image processing apparatus as set forth in claim 4, wherein:

the similarity evaluating section includes a deblurring section for designating a mask region in which a result of detection is not to be outputted, if the specific shape detecting section detects that the binary data include the plurality of mark of the printing-prohibited pattern, then the deblurring section designates, as the mask region, a region extended, by a certain range, from where the plurality of the marks are detected.

6. An image forming apparatus, comprising:
an image processing apparatus as set forth in claim 1; and
a printing apparatus for performing printing, based on image data.

7. A non-transitory computer-readable recording medium in which a program is stored, the program causing a computer to function as sections of an image processing apparatus including:

a similarity evaluating section for detecting, out of input image data, an image pattern similar to a printing-prohibited pattern, and evaluating similarity between the image pattern thus detected and the printing-prohibited pattern, the similarity evaluating section including a specific color detecting section for detecting, out of the input image data, color image data of a specific color of the image pattern, the specific color detecting section including:

a comparing section for comparing, with reference thresholds, color densities of color image data of plural colors in the input image data, so as to judge whether or not the input image data include the color image data of the specific color of the image pattern; and a threshold setting section for setting calculated thresholds or theoretical thresholds as the reference thresholds, wherein the threshold setting section sets a calculated threshold as a reference threshold if the calculated threshold is within an allowable range of the theoretical threshold, and the threshold setting section sets a theoretical threshold as a reference threshold if the calculated threshold is out of the allowable range of the theoretical threshold, the threshold setting section being configured to calculate out the calculated thresholds for the reference thresholds from reference image data obtained by reading out a reference chart having a plurality of colors in predetermined color densities, and the threshold setting section being configured to work out the theoretical thresholds for the reference thresholds according to the predetermined color densities of the reference chart.

8. An image processing method, comprising:
performing a similarity evaluation for detecting, out of input image data, an image pattern similar to a printing-prohibited pattern, and evaluating similarity between the image pattern thus detected and the printing-prohibited pattern, the step of performing the similarity evaluation including performing specific color detection for detecting, out of the input image data, color image data of a specific color of the image pattern, the step of performing the specific color detection including:

comparing, with reference thresholds, color densities of color image data of plural colors in the input image data, so as to judge whether or not the input image data include the color image data of the specific color of the image pattern; and setting calculated thresholds or theoretical thresholds as the reference thresholds, wherein a calculated threshold is set as a reference threshold if the calculated threshold is within an allowable range of the theoretical threshold, and a theoretical threshold is set as a reference threshold if the calculated threshold is out of the allowable range of the theoretical threshold, wherein the calculated thresholds for the reference thresholds are calculated out from reference image data obtained by reading out a reference chart having a plurality of colors in predetermined color densities, and the theoretical thresholds for the reference thresholds are worked out according to the predetermined color densities of the reference chart.

9. An image processing apparatus comprising:
a similarity evaluating section for detecting, out of input image data, an image pattern similar to a printing-prohibited pattern, and evaluating similarity between the image pattern thus detected and the printing-prohibited pattern, the similarity evaluating section including a specific color detecting section for detecting, out of the input image data, color image data of a specific color of the image pattern, the specific color detecting section including:

a comparing section for comparing, with reference thresholds, color densities of color image data of plural colors in the input image data, so as to judge whether or not the input image data include the color image data of the specific color of the image pattern; and a threshold setting section for setting calculated thresholds or theoretical thresholds as the reference thresholds, wherein the threshold setting section sets a calculated threshold as a reference threshold if the calculated threshold is within an allowable range of the theoretical threshold, the threshold setting section sets an upper limit of an allowable range of a theoretical threshold as a reference threshold if the calculated threshold is greater than the upper limit of the allowable range of the theoretical threshold, and the threshold setting section sets a lower limit of an allowable range of a theoretical threshold as a reference threshold if the calculated threshold is smaller than the lower limit of the allowable range of the theoretical threshold, the threshold setting section being configured to calculate out the calculated thresholds for the reference thresholds from reference image data obtained by reading out a reference chart having a plurality of colors in predetermined color densities, and the threshold setting section being configured to work out the theoretical thresholds for the reference thresholds according to the predetermined color densities of the reference chart.

10. The image processing apparatus as set forth in claim 9, wherein:
if the threshold setting section sets, as a reference threshold, a theoretical threshold in replacement of the calculated threshold, the threshold setting section replaces, with the theoretical threshold, only the calculated threshold that is out of the allowable range of the theoretical threshold.

11. The image processing apparatus as set forth in claim 9, wherein:
if the threshold setting section sets, as a reference threshold, a theoretical threshold in replacement of the calculated threshold, the threshold setting section replaces all the calculated thresholds with the theoretical thresholds regardless of whether the calculated thresholds are out of the allowable range of the theoretical threshold.

12. The image processing apparatus as set forth in claim 9, wherein:
the printing-prohibited pattern includes a plurality of marks positioned in a predetermined positional relationship with one another;
the similarity evaluating section further includes a specific shape detecting section and a positional relationship calculating section;
the specific color detecting section outputs binary data that is a result of the detection of the color image data of the specific color of the image pattern;
the specific shape detecting section detects, from the binary data, a relative positional relationship of a plurality of marks of the image pattern, and outputs positional data that is a result of the detection of the relative positional relationship; and
the positional relationship calculating section compares between the relative positional relationship of the plurality of the marks of the image pattern and the predetermined positional relationship of the plurality of the marks of the printing-prohibited pattern, so as to evaluate the similarity between the image pattern and the printing-prohibited pattern.

13. The image processing apparatus as set forth in claim 12, wherein:

the similarity evaluating section includes a deblurring section for designating a mask region in which a result of detection is not to be outputted,
if the specific shape detecting section detects that the binary data includes the plurality of mark of the printing-prohibited pattern, then the deblurring section designates, as the mask region, a region extended, by a certain range, from where the plurality of the marks are detected.

14. An image forming apparatus, comprising:
an image processing apparatus as set forth in claim 9; and
a printing apparatus for performing printing, based on image data.

15. A non-transitory computer-readable recording medium in which a program is stored, the program causing a computer to function as sections of an image processing apparatus including:
a similarity evaluating section for detecting, out of input image data, an image pattern similar to a printing-prohibited pattern, and evaluating similarity between the image pattern thus detected and the printing-prohibited pattern,
the similarity evaluating section including a specific color detecting section for detecting, out of the input image data, color image data of a specific color of the image pattern,
the specific color detecting section including:
a comparing section for comparing, with reference thresholds, color densities of color image data of plural colors in the input image data, so as to judge whether or not the input image data include the color image data of the specific color of the image pattern; and
a threshold setting section for setting calculated thresholds or theoretical thresholds as the reference thresholds, wherein the threshold setting section sets a calculated threshold as a reference threshold if the calculated threshold is within an allowable range of the theoretical threshold, the threshold setting section sets an upper limit of an allowable range of a theoretical threshold as a reference threshold if the calculated threshold is greater than the upper limit of the allowable range of the theoretical threshold, and the threshold setting section sets a lower limit of an allowable range of a theoretical threshold as a reference threshold if the calculated threshold is smaller than the lower limit of the allowable range of the theoretical threshold, the threshold setting section being configured to calculate out the calculated thresholds for the reference thresholds from reference image data obtained by reading out a reference chart having a plurality of colors in predetermined color densities, and the threshold setting section being configured to work out the theoretical thresholds for the reference thresholds according to the predetermined color densities of the reference chart.

16. An image processing method, comprising:
performing similarity evaluation for detecting, out of input image data, an image pattern similar to a printing-prohibited pattern, and evaluating similarity between the image pattern thus detected and the printing-prohibited pattern,
the step of performing the similarity evaluation including performing specific color detection for detecting, out of the input image data, color image data of a specific color of the image pattern,
the step of performing the specific color detection including:

comparing, with reference thresholds, color densities of color image data of plural colors in the input image data, so as to judge whether or not the input image data include the color image data of the specific color of the image pattern; and setting calculated thresholds or theoretical thresholds as the reference thresholds, wherein a calculated threshold is set as a reference threshold if the calculated threshold is within an allowable range of the theoretical threshold, an upper limit of an allowable range of a theoretical threshold is set as a reference threshold if the calculated threshold is greater than the upper limit of the allowable range of the theoretical threshold, and a lower limit of an allowable range of a theoretical threshold is set as a reference threshold if the calculated threshold is smaller than the lower limit of the allowable range of the theoretical threshold, wherein the calculated thresholds for the reference thresholds are calculated from reference image data obtained by reading out a reference chart having a plurality of colors in predetermined color densities, and the theoretical thresholds for the reference thresholds are worked out according to the predetermined color densities of the reference chart.

* * * * *